(12) United States Patent
Leib et al.

(10) Patent No.: US 8,055,100 B2
(45) Date of Patent: Nov. 8, 2011

(54) METHOD AND SYSTEM FOR IMAGE REGISTRATION QUALITY CONFIRMATION AND IMPROVEMENT

(75) Inventors: Michael F. Leib, St. Charles, MO (US); Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1039 days.

(21) Appl. No.: 11/554,722

(22) Filed: Oct. 31, 2006

(65) Prior Publication Data

US 2007/0058885 A1 Mar. 15, 2007

Related U.S. Application Data

(63) Continuation-in-part of application No. 10/817,476, filed on Apr. 2, 2004, now Pat. No. 7,751,651.

(51) Int. Cl.
*G06K 9/32* (2006.01)

(52) U.S. Cl. ........ 382/294; 382/287; 382/293; 382/282; 382/305; 348/263

(58) Field of Classification Search ................. 382/294, 382/282, 287, 293, 305, 312; 348/263
See application file for complete search history.

(56) References Cited

U.S. PATENT DOCUMENTS

| | | | | |
|---|---|---|---|---|
| 4,590,607 A | * | 5/1986 | Kauth | 382/294 |
| 4,635,293 A | | 1/1987 | Watanabe | |
| 4,878,247 A | * | 10/1989 | Wester-Ebbinghaus et al. | 382/113 |
| 4,970,666 A | * | 11/1990 | Welsh et al. | 345/423 |
| 4,988,189 A | | 1/1991 | Kroupa et al. | |
| 5,104,217 A | * | 4/1992 | Pleitner et al. | 356/2 |
| 5,124,915 A | * | 6/1992 | Krenzel | 702/5 |
| 5,173,949 A | | 12/1992 | Peregrim et al. | |
| 5,187,754 A | * | 2/1993 | Currin et al. | 382/284 |
| 5,495,540 A | * | 2/1996 | Frankot et al. | 382/294 |
| 5,550,937 A | * | 8/1996 | Bell et al. | 382/293 |
| 5,606,627 A | * | 2/1997 | Kuo | 382/154 |
| 5,647,015 A | | 7/1997 | Choate et al. | |
| 5,668,739 A | * | 9/1997 | League et al. | 382/103 |

(Continued)

FOREIGN PATENT DOCUMENTS

EP 0841537 5/1998

(Continued)

OTHER PUBLICATIONS

Tsai, Roger; A Versatile Camera Calibration Technique for High Accuracy 3D Machine Vision Metrology Using Off-the-shelf TV Cameras and Lenses; IEEE Journal of Robotics and Automation vol. RA-3, No. 4, dated Aug. 1987.

(Continued)

*Primary Examiner* — Jayesh A Patel (74) *Attorney, Agent, or Firm* — Harness, Dickey & Pierce, P.L.C.

(57) ABSTRACT

A system and method for confirming the accuracy of an image registration process is provided. The method includes: receiving a first image that depicts a scene area; defining a comparison area within a second image that includes the scene area; obtaining a registration model that registers the first image to the second predefined image; constructing a third image from the first image and the comparison area of the second image based on the registration model; and comparing the third image to the second image.

18 Claims, 6 Drawing Sheets

U.S. PATENT DOCUMENTS

| | | | |
|---|---|---|---|
| 5,809,171 A | | 9/1998 | Neff et al. |
| 5,812,705 A | * | 9/1998 | Wang et al. .................. 382/294 |
| 5,890,808 A | * | 4/1999 | Neff et al. .................... 382/209 |
| 5,982,930 A | | 11/1999 | Neff et al. |
| 5,982,945 A | | 11/1999 | Neff et al. |
| 5,995,681 A | * | 11/1999 | Lee et al. ..................... 382/293 |
| 6,266,452 B1 | | 7/2001 | McGuire |
| 6,512,857 B1 | * | 1/2003 | Hsu et al. ..................... 382/294 |
| 6,587,601 B1 | * | 7/2003 | Hsu et al. ..................... 382/294 |
| 6,694,064 B1 | * | 2/2004 | Benkelman .................. 382/284 |
| 6,738,532 B1 | * | 5/2004 | Oldroyd ....................... 382/294 |
| 6,795,590 B1 | * | 9/2004 | Chen ............................ 382/294 |
| 7,522,186 B2 | * | 4/2009 | Arpa et al. ................... 348/153 |
| 7,873,240 B2 | * | 1/2011 | Oldroyd ....................... 382/294 |
| 2002/0012071 A1 | * | 1/2002 | Sun ............................... 348/578 |
| 2004/0041999 A1 | * | 3/2004 | Hogan et al. ............... 356/141.5 |
| 2005/0089213 A1 | * | 4/2005 | Geng ........................... 382/154 |
| 2005/0147324 A1 | | 7/2005 | Kwoh |
| 2005/0220363 A1 | * | 10/2005 | Oldroyd ....................... 382/294 |
| 2006/0215935 A1 | * | 9/2006 | Oldroyd ....................... 382/294 |

FOREIGN PATENT DOCUMENTS

| | | |
|---|---|---|
| WO | WO 99/18732 | 4/1999 |
| WO | WO 9918732 A1 * | 4/1999 |

OTHER PUBLICATIONS

Viola, Paule; Alignment by Maximization of Mutual Information; IEEE International Conference on Computer Vision, Boston, MA 1995.

Barrow, Tenenbaum, Bolles, and Wolf; Parametric Correspondence and Chamfer Matching: Two New Techniques for Image Matching; Proc. IJCAI Vision-7, 1977.

Kiremidjian; Issues in Image Registration; IEEE Proc. of SPIE vol. 758 Image Understanding and the Man-Machine Interface, New York, 1987.

Woo, Neider, Davis, Shreiner. "OpenGL Programming Guide," 3rd Ed., Addison Wesley, Inc., 1999, pp. 127-128; p. 674.

SoftPlotter User's Manual, Vision International, Autometrics, Inc. (now part of the Boeing Company), 1994, pp. 9-1ff.

Digital Point Position Data Base Performance Specification, MIL-PRF-89034, 1999.

Map Projections—A Working Manual, U.S. Geological Survey Paper 1385, 1987, pp. 145-153.

* cited by examiner

METHOD AND SYSTEM FOR IMAGE REGISTRATION QUALITY CONFIRMATION AND IMPROVEMENT

CROSS-REFERENCE TO RELATED APPLICATIONS

This application is a continuation-in-part of U.S. patent application Ser. No. 10/817,476 filed on Apr. 2, 2004 now U.S. Pat. No. 7,751,651. The disclosure of the above application is incorporated herein by reference.

FIELD

The present disclosure relates to methods and systems for validating and verifying an image registration process between images of varying perspectives and geometry.

BACKGROUND

The statements in this section merely provide background information related to the present disclosure and may not constitute prior art.

Modern military aircraft require a capability to target precision-guided weapons. One method to do this is to use sensor images obtained by sensors carried on the aircraft. However, making an on-board sensor highly accurate so that targets can be located within a ground coordinate system with sufficient accuracy is difficult and expensive. These problems can be overcome by registering the sensor image with a predefined, geographically aligned image obtained from a reference image database. When image registration is done with sufficient accuracy, the geographic alignment of the reference image can be applied to the sensor image, to thus obtain sufficient geographic accuracy for target points selected from the sensor image.

As can be appreciated, image registration can be applicable to various systems employing image recognition. In some instances additional confirmation of the validity and accuracy of the registration process may be required. Such is the case with weapon targeting systems as discussed above or with aircraft navigation systems. Such may also be the case with automated inspection systems where errors in the registration process could cause substantial damage to operations or to system components. Systems employing a manual registration process may also suffer unseen errors, and could similarly benefit from a method to confirm the validity and accuracy of the registration process.

Registration quality confirmation has conventionally been achieved by statistical measures applied to control points, identified and measured in the two images. The statistical measures are most commonly performed for manual registration. Measurement of such control point sets can be tedious. Interpretation of the results, while statistically useful, is still a statistical process and not necessarily an indication of validity or accuracy at arbitrary points in the images. In addition, confirming the quality of the registration process can be difficult due to the difference in visual appearance of the two images. For example, the two images may be from different sensors, or be from a similar sensor but at a different time, or even be from the same sensor but from a different point of view. In each instance, the differences in appearance are enough to lower the certainty or accuracy of any registration attempt.

SUMMARY

Accordingly, a system and method of confirming the accuracy of an image registration process is provided. One implementation of the method includes receiving a first image that depicts a scene area; defining a comparison area within a second image that includes the scene area; obtaining a registration model that registers the first image to the second predefined image; constructing a third image from the first image and the comparison area of the second image based on the registration model; and comparing the third image to the second image.

In other features, an image registration confirmation system is provided. In one embodiment, the system includes a registration module that generates a registration model by registering a first image to a second predefined image. A validation module generates a third image based on data from the first image and based on the registration model. A comparison module compares the third image with the second predefined image to confirm the accuracy of the registration model.

In still other embodiments, a system for confirming the registration of a sensor image and a reference image is provided. One embodiment involves using a sensor that generates a sensor image of a scene area. A reference image datastore stores predefined reference images wherein at least one reference image includes the scene area. A registration confirmation module registers the sensor image to the reference image including the scene area and confirms the accuracy of the registration by projecting a perspective of the sensor image to a perspective of the reference image and comparing the projected sensor image to the reference image.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses. It should be understood that throughout the drawings, corresponding reference numerals indicate like or corresponding parts and features.

Figure 1:
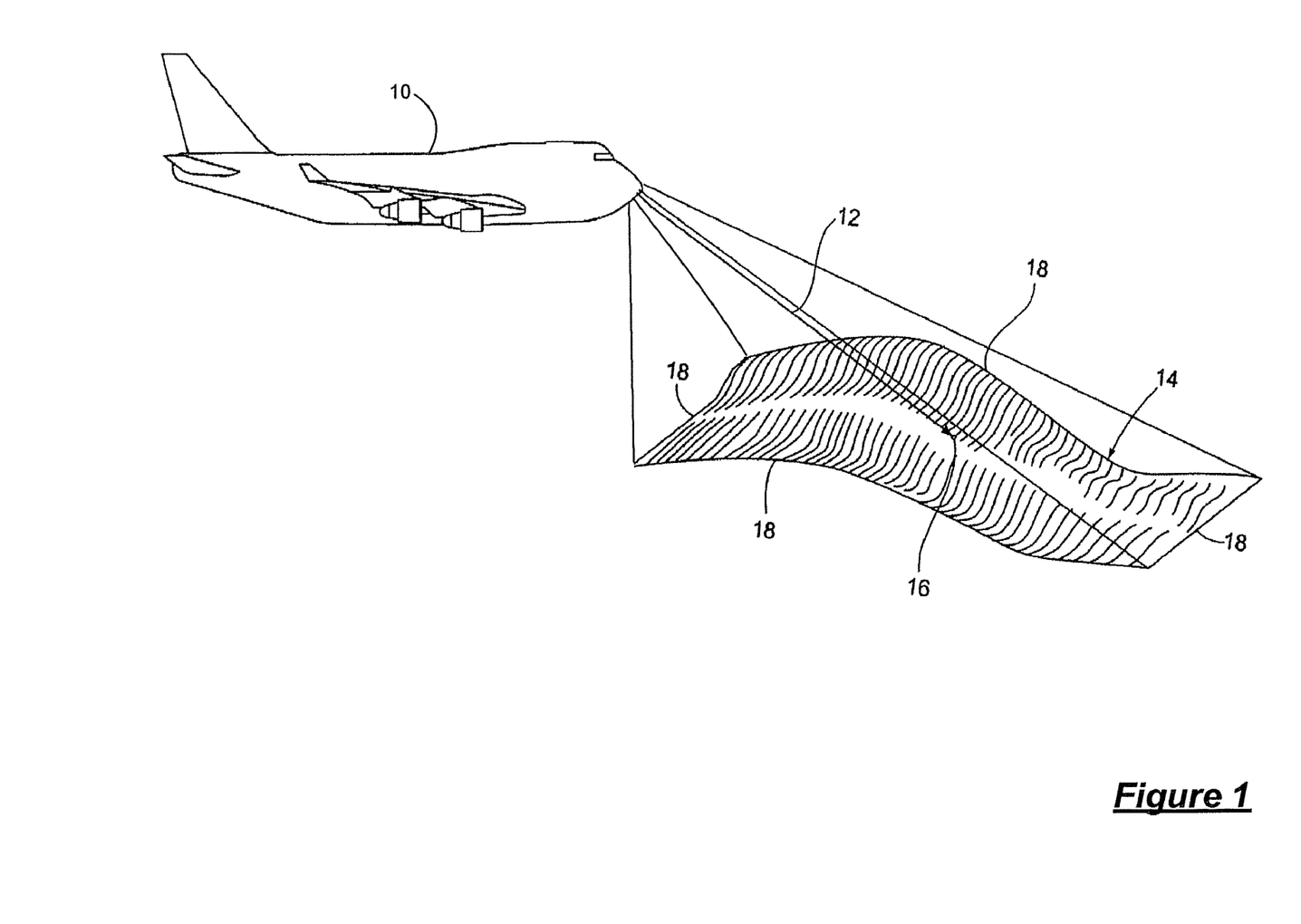
FIG. 1 is a representation of a mobile platform, i.e., an aircraft, having an image sensor that is directed along a line of sight that intersects with a geographic location.

As can be appreciated, the image registration quality confirmation and improvement systems and methods of the present disclosure are applicable to various systems employing image recognition. Such systems may include, but are not limited to, targeting systems, navigation systems, and inspection systems. For exemplary purposes, the disclosure will be discussed in the context of a targeting system for a mobile platform which, in this example, is an aircraft 10. FIG. 1 shows a representation of the aircraft 10 that is equipped with a forward-looking sensor 20 (also shown in FIG. 2) such as a forward-looking infrared (FLIR) sensor or a synthetic aperture radar (SAR) sensor. The figure depicts the aircraft sensor 20 of FIG. 2 having a line of sight 12 that is directed to a geographic area 14 and intersects with the terrain of the geographic area 14 at a particular point 16. Known sensors of this type are capable of sensing the contours of the land and/or objects within predefined boundaries of the geographic area or location 14 represented by the perimeter edge image boundary 18 shown in FIG. 1.

Figure 2:
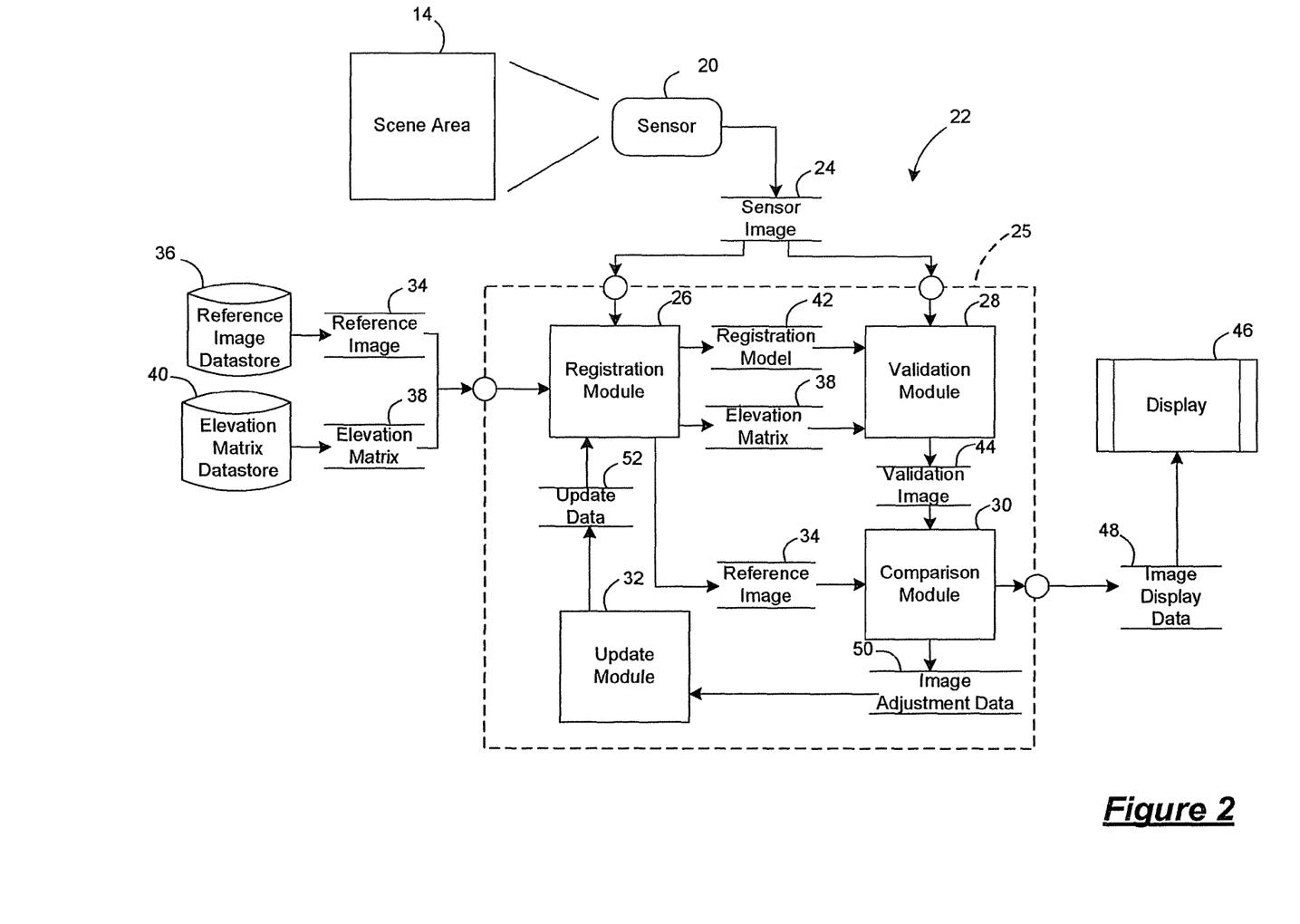
FIG. 2 is a dataflow diagram illustrating an embodiment of an image registration quality confirmation and improvement system.

The sensor 20 (FIG. 2) provides signals to the electronics of the aircraft 10 that produce a visual display (not shown) from a recorded pixel array (not shown) of the sensed image of the scene area 14 around the line of sight 12 within the perimeter image boundary 18. This visual display and the recorded pixel array form a perspective image that depicts the land and objects in the scene area 14 around the point 16 being viewed by the sensor 20 (FIG. 2). Each element of the recorded pixel array corresponds to a pixel (picture element) of the image. The electronics of the aircraft 10 include a registration system that registers the sensor image to a predefined reference image corresponding to the scene area 14. The electronics of the aircraft 10 further include an image registration quality confirmation and improvement system as described hereinafter.

The image registration quality confirmation and improvement systems and methods of the present disclosure provide a means to validate and verify accuracy of an image registration process. Generally speaking, the image registration confirmation and improvement process employs a reference image or design model (hereinafter commonly referred to as a reference image) of the area including a scene. For example, the reference image can be an overhead or an orthographic image of the area, with precisely known geometry, and a precisely aligned elevation matrix for that area. A sub-image is extracted from the reference image and elevation matrix, using a registration model (i.e., camera model) or other perspective information. The sub-image will include the same scene area as depicted in a second image, for example an image received from a sensor (hereinafter referred to as a sensor image). The precise knowledge of the perspective and/or registration model and the geometric model of the scene area is used to prepare a validation image. The validation image includes data from the sensor image projected to coordinates of the sub-image so as to place the sensor image in the same perspective as the reference image. The validation image is then compared with the reference image. Additionally or alternatively, the registration model can be improved by adjusting the parameters of the model. The adjustments can be made based on differences found between the two images while observing the comparison.

With reference to FIG. 2, an exemplary embodiment of an image registration quality confirmation and improvement system 22 is shown. The system 22 includes one or more modules and one or more data storage devices. As used herein, the term "module" refers to at least one of an application specific integrated circuit (ASIC), an electronic circuit, a processor (shared, dedicated, or group) and/or memory that executes one or more software or firmware programs, a combinational logic circuit, and/or other suitable components that provide the described functionality. The one or more data storage devices can be at least one of Random Access Memory (RAM), Read Only Memory (ROM), a cache, a stack, or the like which may temporarily or permanently store electronic data.

The system 22 is shown to communicate with the sensor 20. The system 22 receives and processes data from the sensor 20 that makes up the sensor image 24. The system 22 includes one or more modules operable to perform image registration quality confirmation and improvement based on the sensor image 24. As can be appreciated, various embodiments of the system 22 may include any number of modules and sub-modules. The modules shown in FIG. 2 may be combined and/or further partitioned to similarly perform quality confirmation and improvement for image registration. In the embodiment of FIG. 2, a registration confirmation module 25 includes a registration module 26, a validation module 28, a comparison module 30, and an update module 32.

The registration module 26 receives as an input the sensor image 24. The registration module 26 retrieves a reference image 34 from a reference image datastore 36. The datastore 36 may include a plethora of predefined data for each pixel or coordinate of a geographic area. The reference image 34 is a subset of this pixel data that corresponds to the scene area 14 discovered by the sensor 20. The registration module 26 may also retrieve an elevation matrix 38 that aligns with the reference image 34 from an elevation matrix datastore 40.

The registration module 26 retrieves and matches the reference image 34 and the corresponding elevation matrix 38 to the sensor image 24 based on image registration methods. In one embodiment, the registration module 26 matches the reference image 34 to the sensor image 24 based on the automatic image registration methods as described in U.S. patent application Ser. No. 10/817,476 and incorporated herein by reference. The registration module 26 generates a registration model 42 that depicts the matching relationship between the sensor image 24 and the reference image 34. As can be appreciated, the registration model 42 can be a two-dimensional or a three-dimensional model. The dimensions of the registration model 42 can depend on whether the registration method employed includes data from the elevation matrix 38 in the registration model 42. As illustrated in FIG. 2, the registration model 42 in this example is two-dimensional and the elevation matrix 38 is provided as a separate data entity.

The validation module 28 receives as input the sensor image 24, the registration model 42, and the elevation matrix 38. Based on the inputs 24, 42, and 38, the validation module 28 generates a validation image 44. More particularly, a validation image storage is defined to hold the validation image 44. The storage includes a size and a shape to match the size and shape of the reference image 34 or a sub-image of the reference image 34 that corresponds to the scene area 14. The size and the shape are established through the registration model 42. The registration model 42 provides a pixel-to-pixel correspondence between the sensor image 24 and the reference image 34. Using this correspondence, pixel locations of the sensor image 24 are projected to the validation image 44. Data from the sensor image 24 is used to populate the data of the validation image 44. In various embodiments, elevation data from the elevation matrix 38 or the registration model 42 is used to populate the data of the validation image 44. Methods and systems for constructing the validation image will be discussed in more detail below.

The comparison module 30 receives as input the validation image 44 and the reference image 34. The comparison module 30 provides a means for performing a comparison between the validation image 44 and the reference image 34. In various embodiments, the two images 34, 44 can be automatically compared based on various automatic data comparison methods. In various other embodiments, the comparison module 30 displays both images on a display 46 via image display data 48. The images 34, 44 can be visually compared by an operator viewing the display 46. Visual display methods may include, but are not limited to, an alternating display method, an overlay method, and a wiper bar method.

More particularly, the alternating or flicker display method provides an alternating display of the two images 34, 44 with automatic or operator controlled switching between the two images 34, 44. This allows the operator to perceive common, well-registered features as stationary over time. Mis-registered or non-represented features are perceived as "jumping" over time. The overlay method overlays the two images 34, 44 with a top one of the two images 34, 44 being partially transparent. This allows the bottom image to also be seen. The operator visually perceives both images 34, 44 simultaneously. Mis-registered features appear as "doubled" or blurred. The "wiper bar" method provides a bar that slides across the display 46. The two images 34, 44 appear on opposite sides of the bar. Mis-registered features appear to "jump" or to "break" and rejoin as the bar passes across the display 46.

Based on the comparison, the validation image 44 can be adjusted either manually by input (not shown) received from the operator or automatically using adjustment methods. The adjustments to the validation image 44 are stored as adjustment data 50. The update module 32 receives as input the adjustment data 50. The update module 32 processes the adjustment data 50 based on the method used to perform the adjustment. Such methods may include, but are not limited to, shifting, translating, and rotating. The update data 52 is generated based on the relationship between the registration model 42 and the validation image 44. The registration module 26 then receives the update data 52 and updates the registration model 42 accordingly.

Figure 3:
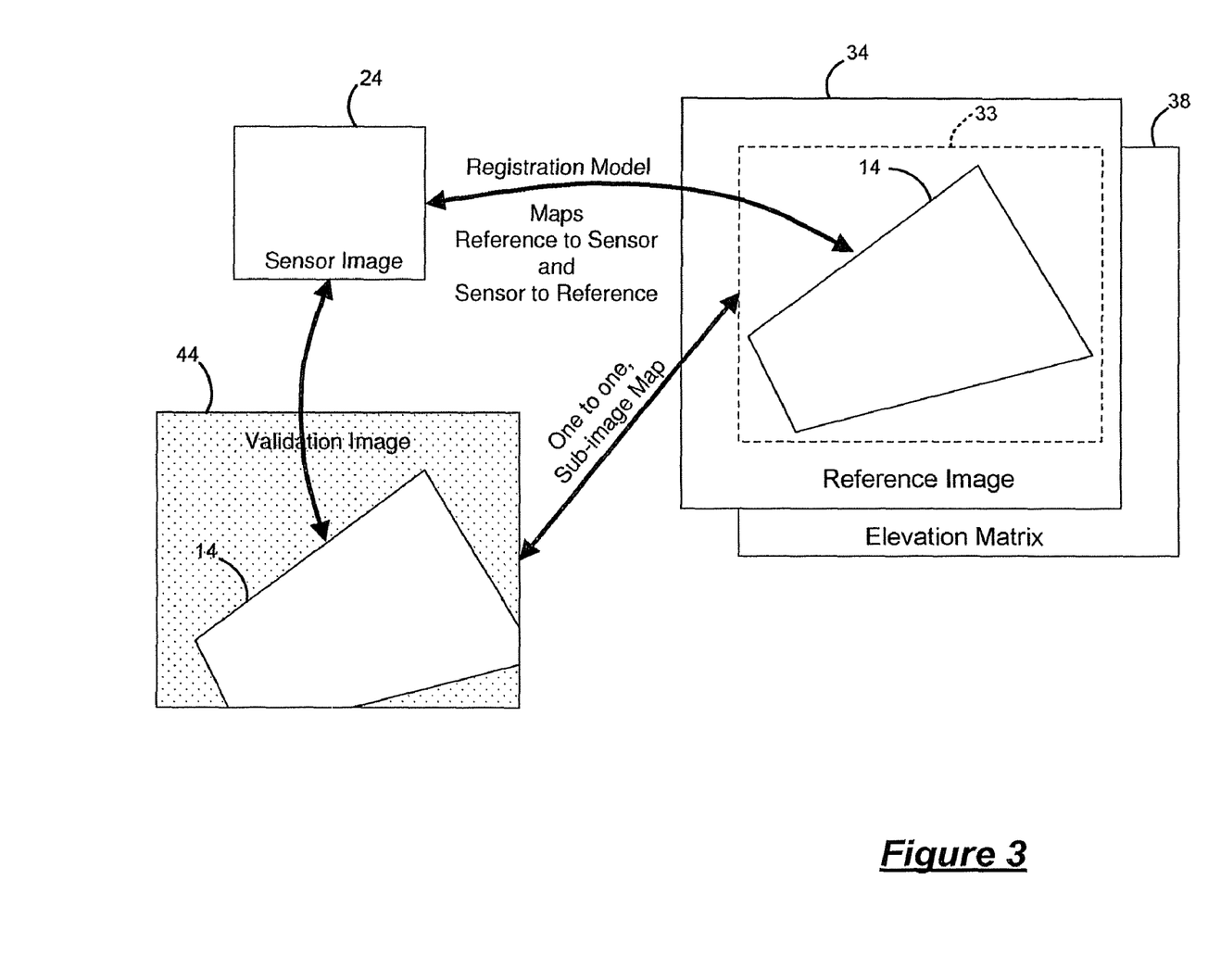
FIG. 3 is a block diagram illustrating the relationships between images produced by the image registration quality confirmation and improvement system.

With reference to FIG. 3, a block diagram illustrates the relationships between the images produced by the image registration quality confirmation and improvement system 22 of FIG. 2. Initially, the sensor image 24 of the scene area 14 is obtained. The sensor image 24 is registered to a sub-image 33 of the reference image 34 including the scene area 14. The reference image 34 has an accurately known relationship to a scene coordinate system (not shown). This provides the sensor image 24 with an accurately known relationship to the same scene coordinate system. The relationship between the sensor image 24 and the scene coordinate system of the reference image 34 may include some small error due to residual error in registering the sensor image 24 to the sub-image 33 of the reference image 34.

The elevation matrix 38 giving surface heights of the scene area 14 is associated with the scene area coordinate system of the reference image 34. Through the scene area coordinate system a relationship between the sensor image 24 and the elevation matrix 38 can be established. Using the accurately known relationship between the sensor image 24 and the reference image 34, and the sensor image 24 and the elevation matrix 38, the validation image 44 that matches the geometry of the reference image 34 while containing the image content of the sensor image 24 can be produced. The validation image 44 can then be compared to the sub-image 33 of the reference image 34 or to the reference image 34, to confirm validity of the image registration. This operation also verifies the accuracy in the reference image 34 of the locations of features seen in only the sensor image 24, or seen in both the sensor and reference images 24, 34. As shown in FIG. 3, the scene area 14 in the validation image 44 is misplaced due to the registration error. The validation image 44 can then be manually or automatically adjusted in comparison to the reference image 34, to correct residual offset error in the known relationship between the sensor image 24 and the scene coordinate system, effecting an improvement in the image registration.

Figure 4:
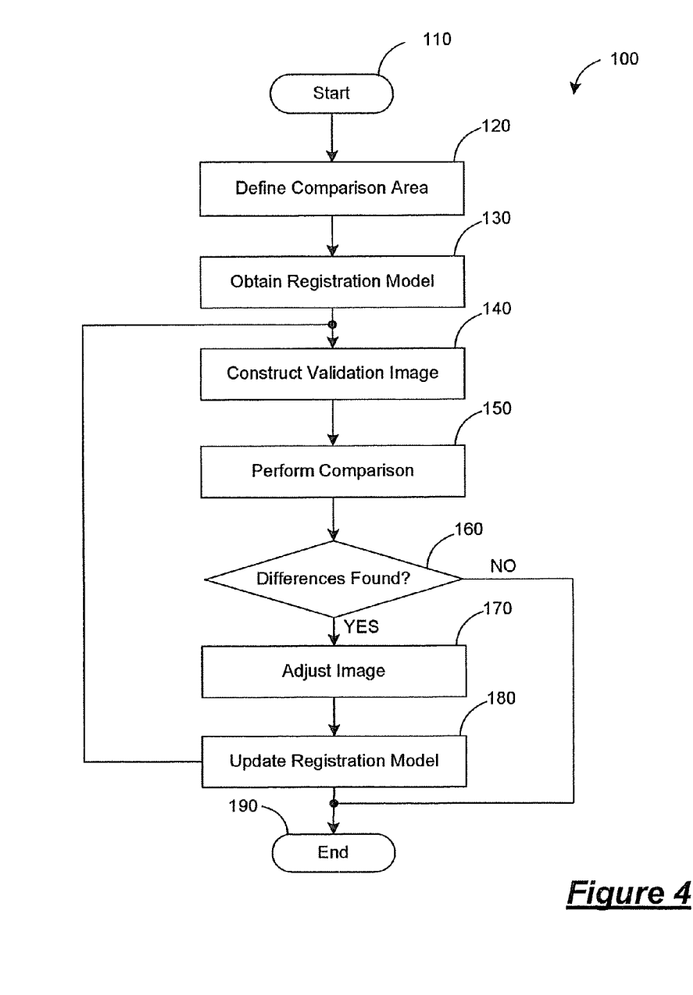
FIG. 4 is a flowchart illustrating an embodiment of an image registration quality confirmation and improvement method.

Referring now to FIG. 4, a flowchart illustrates an exemplary implementation of an image registration quality confirmation and improvement method 100. As can be appreciated, the operation of the image registration quality confirmation and improvement method 100 can be executed in varying order and therefore is not limited strictly to the sequential execution as illustrated in FIG. 4. The method may begin at operation 110. A sub-image 33 is defined at operation 120 to encompass sufficient area within the reference image 34 to include a majority or all of the scene area 14 depicted in the sensor image 24. The sub-image 33 may be defined to match a rectangle of pixels in the reference image 34 or a rectangle of scene area coordinates. The sub-image 33 may be any geometric shape. A registration model that associates coordinate or pixel locations in the sensor image 24 with coordinate or pixel locations in the scene area 14 of the reference image 34 is obtained at operation 130. This registration model may be one used in establishing the sensor image registration to the scene area coordinate system (i.e. registration model), or it might be newly defined, based on knowledge of the accurately known relationship between the sensor image 24 and the scene area coordinate system.

Once the comparison area is defined at operation 120 and the registration model is obtained at operation 130, the validation image 44 is constructed at operation 140. Operation of the validation image construction method will be discussed in more detail in the context of FIGS. 5 and 6. At operation 150, the validation image 44 is compared to the reference image 34. If differences exist between the two images 34, 44 at operation 160, the validation image 44 is adjusted either manually and/or automatically at operation 170 and the registration model is updated from data obtained during the adjustment process at operation 180. Otherwise, if no differences exist, the method proceeds to the end at operation 190. As can be appreciated, the construction, comparison, adjustment, and update operations can be iteratively performed until an operator is satisfied with the output of the comparison or there exists no differences between the two images (as shown in FIG. 4).

Figure 5:
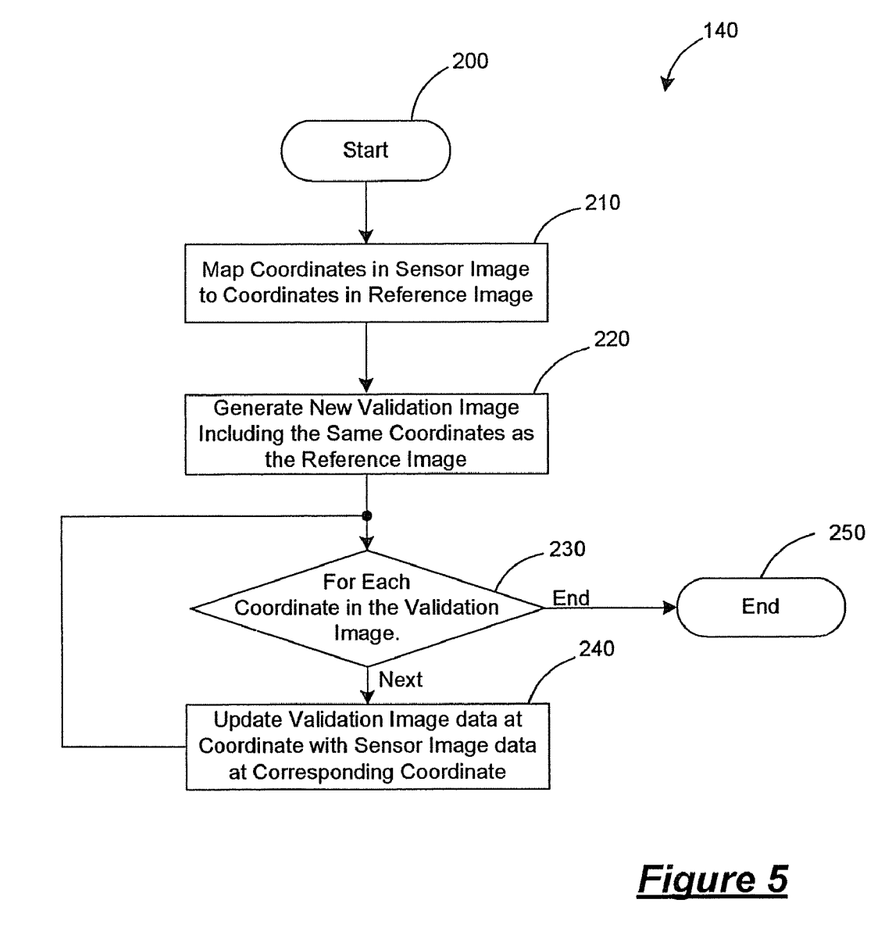
FIG. 5 is a flowchart illustrating an embodiment of a validation image construction method as performed by the image registration quality confirmation and improvement method.
Figure 6:
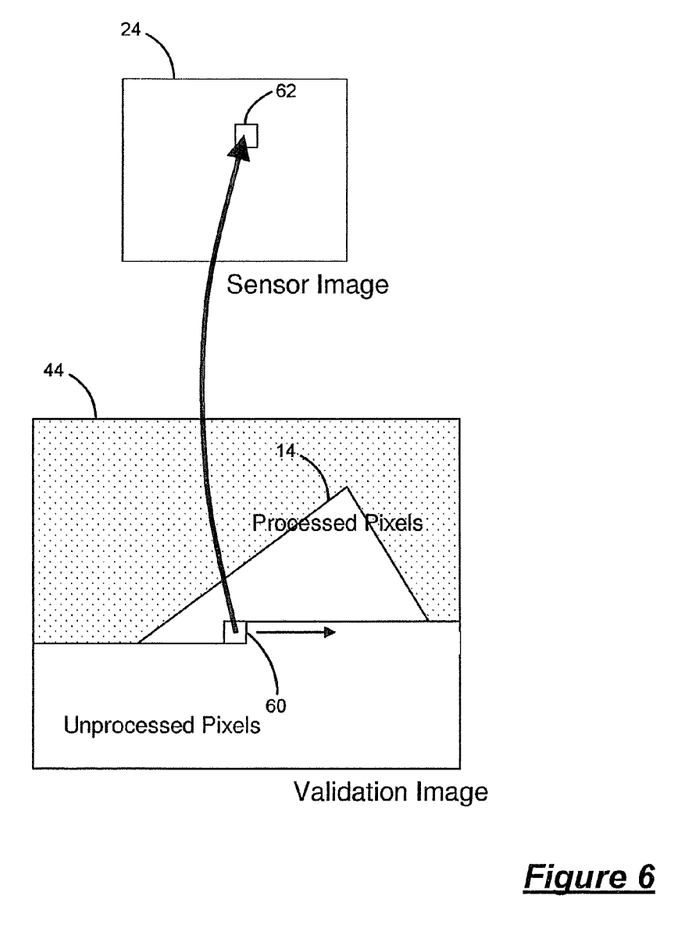
FIG. 6 is a block diagram illustrating the pixel-to-pixel relationship used to construct a validation image.

With reference to FIGS. 5 and 6, FIG. 5 includes a flowchart that illustrates an exemplary implementation of a validation image construction method 140. As can be appreciated, operation of the validation image construction method 140 can be executed in varying order and therefore is not limited strictly to the sequential execution as illustrated in FIG. 5. FIG. 6 illustrates an exemplary coordinate-to-coordinate or pixel-to-pixel relationship used to construct the validation image 44. In FIG. 5, the method may begin at 200. Coordinates in the sensor image 24 are mapped to coordinates in the reference image 34 using the one-to-one relationship established by the registration model at operation 210. A new validation image 44 is generated including the same coordinates as the reference image at operation 220. For each coordinate or pixel 60 in the validation image 44, the data for the coordinate or pixel 60 is updated with the corresponding data from the coordinate or pixel 62 of the sensor image 24 at operation 230 and 240. As can be appreciated, the order of traversing through each coordinate or pixel 60 at operation 230 can be done on a column by column basis (not shown) or a row by row basis (as shown in FIG. 6) of the validation image 44. Once the data for each coordinate or pixel 60 of the validation image 44 is updated at operation 230, the method may end at operation 250.

As can be appreciated, various other relationships and methods may be used to construct the validation image. In one other embodiment, the coordinate-to-coordinate or pixel-to-pixel relationship and method used to construct the validation image 44 is described in U.S. patent application Ser. No. 11/174,036, which is incorporated herein by reference.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A method of confirming the accuracy of an image registration process, comprising:
   receiving a first image that depicts a scene area;
   defining a comparison area within a second predefined image that includes the scene area;
   obtaining from a datastore an elevation matrix that aligns with the second predefined image;
   obtaining a registration model that registers the first image to the second predefined image;
   constructing a third image from the first image and the comparison area of the second predefined image, based on the registration model and the elevation matrix wherein the constructing a third image including an operation of projecting data, pixel-by-pixel from the first image, onto the third image using the registration model, the elevation matrix;
   comparing the third image to the second predefined image; and
   wherein constructing a third image comprises:
   constructing the third image based on a size and shape of the comparison area;
   matching coordinates of the third image to coordinates of the first image based on the registration model; and
   for each coordinate in the third image updating data of the coordinate with corresponding data from the first image.

2. The method of claim 1, further comprising adjusting the third image with respect to the second image and updating the registration model based on results from the adjusting of the third image.

3. The method of claim 1, wherein receiving a first image comprises receiving the first image from a sensor that senses the scene area.

4. The method of claim 1, further comprising displaying the third image and the second image on a display, and wherein the comparing is able to be performed by an operator viewing the display.

5. The method of claim 4, wherein the displaying comprises displaying the third image and the second image using at least one of an alternating display method, an overlay method, and a wiper bar method.

6. The method of claim 1, wherein the second predefined image comprises an overhead image or an orthographic image of the area, including a known geometry and the elevation matrix.

7. An image registration confirmation system, comprising:
   a first hardware processing subsystem that implements a registration module that generates a registration model using an elevation matrix by registering a first image to a second predefined image, with information from the elevation matrix aligned with pixels representing the second predefined image;
   a second hardware processing subsystem that implements a validation module that generates a third image based on data from the first image and the registration model; and
   a third hardware processing subsystem that implements a comparison module that compares the third image with the second predefined image to confirm the accuracy of the registration model; and
   wherein the third image is created by the validation module by projecting data, pixel-by-pixel, from the first image onto the third image using the registration model and the elevation matrix; and
   wherein the validation module generates the third image by conforming a perspective of the first image to a perspective of the second image;
   wherein the first image depicts a scene area; and
   wherein the validation module:
     defines a comparison area of the second image to include the scene area;
     matches coordinates of the comparison area to coordinates of the third image based on the registration model; and
     for each coordinate in the third image, updates data of the coordinate with corresponding data from the first image.

8. The system of claim 7, wherein the comparison module adjusts the third image with respect to the second image, and wherein an update module updates the registration model based on results from the adjusting.

9. The system of claim 7, wherein the comparison module displays the third image and the second image to a display, and wherein the comparing is performed by an operator viewing the display.

10. The system of claim 9, wherein the comparison module displays the third image and the second image to the display based on at least one of an alternating display method, an overlay method, and a wiper bar method.

11. The system of claim 7, wherein the second predefined image is at least one of an orthographic image and an overhead image of the area, including a known geometry and the aligned elevation matrix.

12. The system of claim 7, wherein the first image is an image of at least one of unknown geometry and unknown perspective.

13. The system of claim 7 wherein the first image is generated by a sensor.

14. A system for confirming the registration of a sensor image and a reference image, comprising:
   a sensor that generates a sensor image of a scene area;
   a reference image datastore that stores predefined reference images, wherein at least one of the reference images includes the scene area;

a datastore for storing predefined elevation data, the predefined elevation data being used to generate an elevation matrix for the reference image; and a registration confirmation module that registers the sensor image to the reference image including the scene area, to form a registration model, and that confirms the accuracy of the registration by projecting a perspective of the sensor image to a perspective of the reference image to create a validation image, and compares the projected perspective of the sensor image to the perspective of the reference image; and wherein the registration confirmation module further uses the elevation matrix and projects data, pixel-by-pixel from the sensor image, onto the validation image using the registration model and the elevation matrix;

wherein the validation module generates the third image by conforming a perspective of the first image to a perspective of the second image;

wherein the first image depicts a scene area; and wherein the validation module:

defines a comparison area of the second image to include the scene area;

matches coordinates of the comparison area to coordinates of the third image based on the registration model; and for each coordinate in the third image, updates data of the coordinate with corresponding data from the first image.

15. The system of claim 14, further comprising a display that displays the projected sensor image and the reference image.

16. The system of claim 14, wherein the registration confirmation module projects the elevation data to the projected sensor image.

17. The system of claim 14, wherein the registration confirmation module further updates registration between the sensor image and the reference image based on results of the comparing.

18. An aircraft including an image registration quality confirmation system, wherein the image quality confirmation system comprises:

a sensor that generates a sensor image of a scene area;

a reference image datastore that stores predefined reference images, wherein at least one of the reference images includes the scene area;

a datastore for storing predefined elevation data, the predefined elevation data being used to generate an aligned elevation matrix for the reference image; and a registration confirmation module that registers the sensor image to the reference image including the scene area, to create a registration model, and that confirms the accuracy of the registration by projecting a perspective of the sensor image to a perspective of the reference image to create a validation image, and comparing the projected perspective of the sensor image to the perspective of the reference image;

wherein the registration confirmation module further uses the elevation matrix and projects data, pixel-by-pixel, from the sensor image onto the validation image using the registration model and the elevation matrix; and wherein the validation module generates the third image by conforming a perspective of the first image to a perspective of the second image; and wherein the first image depicts a scene area; and wherein the validation module:

defines a comparison area of the second image to include the scene area;

matches coordinates of the comparison area to coordinates of the third image based on the registration model; and for each coordinate in the third image, updates data of the coordinate with corresponding data from the first image.

* * * * *